P. ZOBOLI & G. VICENTINI.
LATERAL MUD GUARD.
APPLICATION FILED OCT. 5, 1914.
1,183,419.
Patented May 16, 1916.
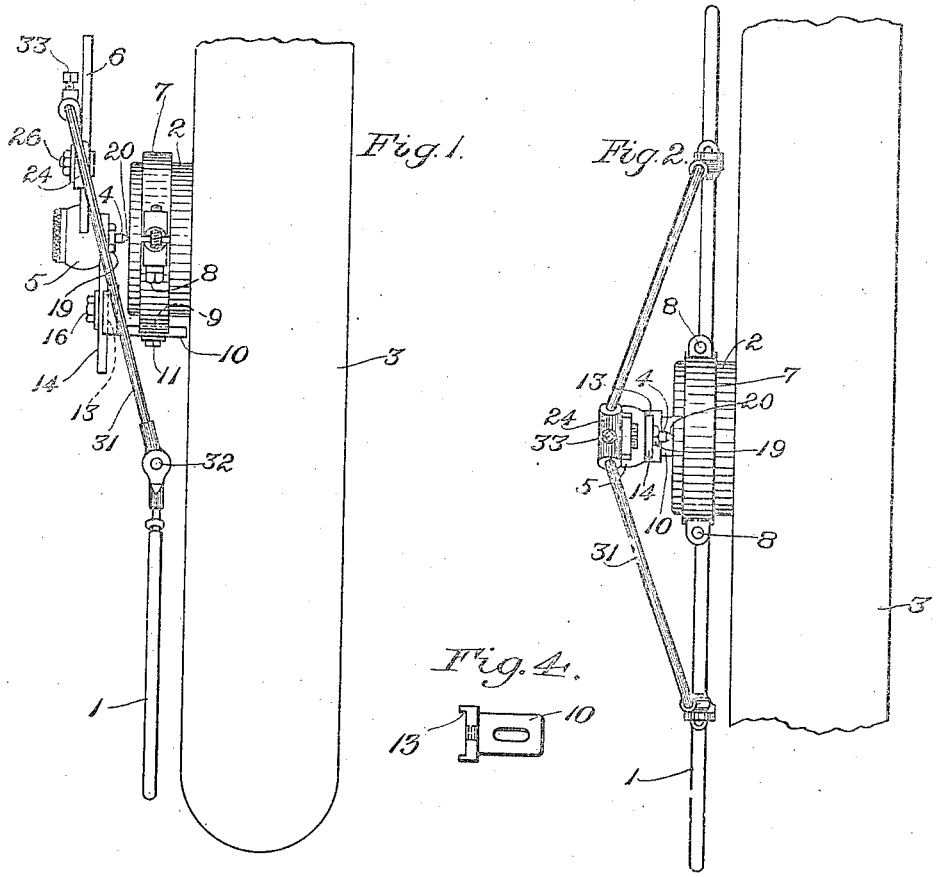
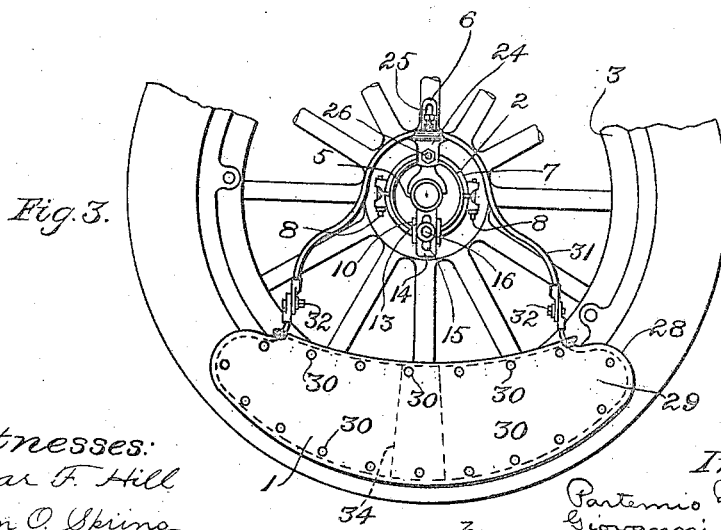
Witnesses:
Oscar F. Hill
Ellen O. Spring
Inventors:
Partenio Zoboli
Giovanni Vicentini
Chas. F. Randall
Attorney.

UNITED STATES PATENT OFFICE.

PARTEMIO ZOBOLI AND GIOVANNI VICENTINI, OF CAMBRIDGE, MASSACHUSETTS.

LATERAL MUD-GUARD.

1,183,419.        Specification of Letters Patent.        Patented May 16, 1916.

Application filed October 5, 1914. Serial No. 865,017

*To all whom it may concern:*

Be it known that we, PARTEMIO ZOBOLI and GIOVANNI VICENTINI, respectively a citizen of the United States and a citizen of Italy, residing at Cambridge, in the county of Middlesex, State of Massachusetts, have invented a certain new and useful Improvement in Lateral Mud-Guards, of which the following is a specification, reference being had therein to the accompanying drawings.

The invention resides in an improved lateral mud-guard of the type in which the splash-apron is suspended in a plane parallel to the plane of the wheel, adjacent to the tread of the wheel and in position to intercept mud splashed laterally by the wheel.

The invention provides a gravitating mud-guard and improved means to suspend the splash-apron thereof alongside a wheel, with the inclusion of means giving capacity for adjustment laterally toward and from the wheel.

In the preferred embodiment of the invention, there are provided a bearing member and adjustable devices to secure the same to a wheel-hub, said bearing member being constructed to provide for support for the splash-apron while permitting rotation of the wheel without affecting the position of the mud-guard.

The invention consists in certain novel features of construction and arrangement of parts which will be fully disclosed in the following specification and accompanying drawing and particularly pointed out in the claims.

In the drawing, Figure 1 is a view in front elevation of a mud-guard involving our invention, the same being shown applied to a wheel of an automobile. Fig. 2 is a plan view of the parts shown in Fig. 1. Fig. 3 is a view in side elevation. Fig. 4 is a view showing arm 10 detached.

Having reference to the drawings,—1 designates a gravitating splash-apron which, in accordance with our invention, is rotatably supported from the hub 2 of a wheel 3 with capacity for adjustment toward and from the plane of the wheel and also radially toward and from the axis of said wheel. A bearing member or journal 4 is adjustably secured to the hub 2 and serves as one member of a bearing serving for the support of the splash-apron. The other member 5 of such bearing is provided with an arm 6 to which the splash-apron 1 is adjustably connected.

The attaching devices by which the bearing member or journal 4 is secured to the wheel-hub are designed to permit attachment to hubs of a variety of types and sizes, and are adjustable to permit the said bearing member to be placed coaxial with any such hub and, when desired, against the end of the same.

As shown, a two-part split ring 7 is provided to encircle the wheel-hub 2, and it is tightened thereupon by means of screws 8, 8. One member of said two-part clamping ring is formed with a transverse guideway as indicated at 9, Fig. 1, to receive a horizontal arm 10 which extends parallel to the axis of the wheel-hub. To permit arm 10 to be adjusted longitudinally within such slideway the said arm is slotted longitudinally as shown in Fig. 4, and the stem of a clamping screw 11 extends through the slot into a threaded hole tapped in the lower section of the split ring 7. The said screw serves to secure the arm in adjusted position in the slideway. Said arm extends outward beyond the end of the hub, and at its outer end is formed with a vertical slideway 13 in which a radially disposed arm 14 is mounted. To provide for adjustment of the radial arm toward and from the center of the hub, it is formed with a longitudinal slot 15 and the stem of a screw 16 extends through the said slot into a threaded hole tapped in the bottom of the slideway 13. Said screw serves to clamp the arm 14 in adjusted position in the slideway. The bearing member or journal 4 is connected rigidly to the inner end of said radial arm, and from this bearing member the splash-apron is suspended. As shown, the bearing member is in the form of a bolt extending through a hole in the inner end of said arm and secured by a nut 19. The end of the bolt preferably is tapered to present an index 20 to assist in determining when the parts are properly positioned coaxially with respect to the wheel-hub.

The clamping ring which encircles the wheel-hub, together with the horizontal and radial arms, provide adjustable means for securing the bearing member or journal securely to the wheel-hub, and for adjustment of the said bearing member into position coaxial with said wheel-hub. The construction is such that the device may be attached in proper working relations to wheel-hubs of different sizes and construction. One ring may be used with hubs which vary considerably in size or if desired clamping rings of various sizes may be provided, all having similar slideways to receive the horizontal arm 10.

The splash-apron 1 is suspended from the bearing member or journal 4 in a manner to allow rotation of the latter without affecting the normal position of the splash-apron, and also so as to allow the splash-apron to swing forward and rearward relative to said bearing member. Thus the splash-apron is permitted to hang normally in its working position shown in the drawings, and to be swung in a plane parallel with the side of the wheel in case it encounters an obstruction during the travel of the vehicle forward or backward. The means of suspension also is such as to permit adjustment laterally toward and from the plane of the wheel and vertically toward and from the ground, into the desired position relative to the wheel to suit the requirements of use. As shown, an arm 6, which in the position normally occupied by the gravitating splash-apron preferably stands upright, is provided with a bearing member 5 which is rotatably mounted upon the aforesaid bearing member or journal 4 as previously noted. As shown, the bearing member 5 is a roller bearing. A bracket 24 is adjustably mounted upon said upstanding arm, being formed to fit slidably thereupon. To permit said bracket to be adjusted up and down upon the upstanding arm, so as to vary the height of the splash-apron relative to the ground, the said arm is centrally slotted as indicated at 25, and a bolt 26 extending through the bracket and said slot clamps the bracket in adjusted position.

The splash-apron consists of a frame 28 and a covering 29 of leather or other suitable material, the edge of which is folded around the frame and secured by rivets or gromets 30. A weight 34 is secured to the frame of the splash-apron and serves both to stiffen the frame and to add weight and stability to the guard.

A suspending bail 31 of substantially U-shape is pivotally connected at its ends to the frame of the splash-apron by bolts 32, 32, and at its bend it is pivotally mounted in a socket-bearing with which the bracket 24 is provided. The link 31 may be swung inward or outward about its pivotal mounting in connection with the bracket, and secured by a clamping screw 33 in the position into which it has been swung laterally. These provisions enable the splash-apron to be adjusted laterally toward and from the plane of the wheel. The splash-apron may be swung in a lateral direction about its pivotal connection with the link 31 so as to extend down from the link 31 in the desired vertical or other position and secured in such position by tightening the bolts 32, 32.

We claim as our invention,—

1. A gravitating lateral mud-guard comprising a splash-apron, a support comprising a clamping ring adapted to encircle a wheel-hub, and a journal member from which the splash-apron is suspended, said journal member connected to said clamping ring and adjustable radially relative thereto toward and from the axis thereof whereby said journal member may be secured to a wheel-hub coaxially therewith.

2. A gravitating lateral mud-guard comprising a splash-apron, a support comprising a clamping member adapted to be fixedly secured to a wheel-hub, a journal member, and adjustable connections between said journal member and clamping member whereby said journal member may be adjusted longitudinally and radially with respect to said hub and held in adjusted position.

3. A gravitating lateral mud-guard comprising a splash-apron, a support attachable to the hub of a wheel to rotate therewith and presenting a bearing member concentric with the hub, and a depending link rotatably supported upon said bearing member and having adjustable connections with the splash-apron and with the said bearing member whereby said splash-apron may be adjusted relatively toward and from the plane of the wheel by which it is supported.

4. In a device of the character described, a pivotal support for a mud-guard and means to adjustably secure the same to a wheel-hub comprising a clamping ring to tightly embrace the wheel-hub, a horizontally disposed arm connected to said clamping ring to extend parallel to the axis of the wheel-hub and beyond the end thereof, a radially disposed arm connected to the horizontally disposed arm, said parts being adapted for adjustment of said arm toward and from the plane of the clamping ring and radially toward and from the axial center thereof whereby the pivotal support may be adjusted to desired position relative to the hub and clamped in position.

In testimony whereof we affix our signatures, in presence of two witnesses.

PARTEMIO ZOBOLI.
GIOVANNI VICENTINI.

Witnesses:
NATHAN B. DAY,
CHAS. I. RANDALL.